US010265591B2

(12) United States Patent
Morales et al.

(10) Patent No.: US 10,265,591 B2
(45) Date of Patent: *Apr. 23, 2019

(54) GOLF CLUB WEIGHT ATTACHMENT MECHANISMS AND RELATED METHODS

(71) Applicant: KARSTEN MANUFACTURING CORPORATION, Phoenix, AZ (US)

(72) Inventors: Eric J. Morales, Laveen, AZ (US);
Martin R. Jertson, Phoenix, AZ (US)

(73) Assignee: Karsten Manufacturing Corporation, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/862,419

(22) Filed: Jan. 4, 2018

(65) Prior Publication Data

US 2018/0126235 A1 May 10, 2018

Related U.S. Application Data

(63) Continuation of application No. 15/369,303, filed on Dec. 5, 2016, now Pat. No. 9,878,222, which is a continuation of application No. 14/614,175, filed on Feb. 4, 2015, now Pat. No. 9,539,475, which is a continuation of application No. 13/745,507, filed on Jan. 18, 213, now Pat. No. 8,951,143, and a (Continued)

(51) Int. Cl.
| | |
|---|---|
| *A63B 53/04* | (2015.01) |
| *A63B 53/06* | (2015.01) |
| *A63B 60/00* | (2015.01) |
| *A63B 53/00* | (2015.01) |
| *B23P 11/00* | (2006.01) |

(52) U.S. Cl.
CPC .............. *A63B 53/06* (2013.01); *A63B 53/04* (2013.01); *A63B 53/047* (2013.01); *A63B 53/0466* (2013.01); *A63B 60/00* (2015.10); *B23P 11/00* (2013.01); *A63B 53/0487* (2013.01); *A63B 2053/0408* (2013.01); *A63B 2053/0412* (2013.01); *A63B 2053/0433* (2013.01); *A63B 2053/0462* (2013.01); *A63B 2053/0491* (2013.01); *A63B 2209/00* (2013.01); *A63B 2225/64* (2013.01); *Y10T 29/49826* (2015.01); *Y10T 29/49906* (2015.01); *Y10T 29/49908* (2015.01); *Y10T 29/49922* (2015.01)

(58) Field of Classification Search
CPC ..... A63B 53/06; A63B 53/0466; A63B 53/04; A63B 53/047; A63B 2053/0433; A63B 2053/0412; A63B 2053/0408; A63B 2209/00; A63B 2225/64; A63B 2053/0491; A63B 53/0487; A63B 2053/0462
USPC .......................... 473/324–350, 287–292, 256
See application file for complete search history.

(56) References Cited

U.S. PATENT DOCUMENTS

| | | |
|---|---|---|
| 1,167,387 A | 1/1916 | Daniel |
| 2,163,091 A | 6/1939 | Held |
| 2,846,228 A | 8/1958 | Reach |

(Continued)

*Primary Examiner* — Sebastiano Passaniti

(57) ABSTRACT

Embodiments of golf club weight attachment mechanisms are described herein. In some embodiments, a golf club head comprises a head body with an interior cavity, a shell portion, and a bracket with a weight member coupled to the bracket. In one embodiment, the bracket and the weight member can be configured to be fully contained within the interior cavity. Other examples and related methods are also described herein.

18 Claims, 4 Drawing Sheets

Related U.S. Application Data continuation-in-part of application No. 12/762,182, filed on Apr. 16, 2010, now Pat. No. 8,449,405.

(60) Provisional application No. 61/590,228, filed on Jan. 24, 2012, provisional application No. 61/186,311, filed on Jun. 11, 2009.

(56) References Cited

U.S. PATENT DOCUMENTS

| | | | |
|---|---|---|---|
| 3,606,327 A | | 9/1971 | Gorman |
| 4,043,563 A | | 8/1977 | Churchward |
| 4,052,075 A | | 10/1977 | Daly |
| 4,085,934 A | | 4/1978 | Churchward |
| 4,313,607 A | | 2/1982 | Thompson |
| 4,630,825 A | * | 12/1986 | Schmidt ............... A63B 53/04 164/35 |
| 5,385,348 A | | 1/1995 | Wargo |
| 5,720,673 A | | 2/1998 | Anderson |
| 5,935,019 A | | 8/1999 | Yamamoto |
| 5,967,905 A | | 10/1999 | Nakahara et al. |
| 6,030,295 A | | 2/2000 | Takeda |
| 6,033,321 A | | 3/2000 | Yamamoto |
| 6,056,649 A | | 5/2000 | Imai |
| 6,062,988 A | | 5/2000 | Yamamoto |
| 6,162,132 A | * | 12/2000 | Yoneyama ............ A63B 53/04 473/338 |
| 6,203,448 B1 | | 3/2001 | Yamamoto |
| 6,206,789 B1 | | 3/2001 | Takeda |
| 6,306,048 B1 | | 10/2001 | McCabe et al. |
| 6,319,149 B1 | | 11/2001 | Lee |
| 6,379,265 B1 | | 4/2002 | Hirakawa et al. |
| 6,409,612 B1 | | 6/2002 | Evans et al. |
| 6,533,679 B1 | | 3/2003 | McCabe |
| 6,902,495 B2 | | 6/2005 | Pergande et al. |
| 7,101,291 B2 | | 9/2006 | Yamamoto |
| 7,244,188 B2 | | 7/2007 | Best |
| 7,261,643 B2 | | 8/2007 | Rice et al. |
| 7,281,988 B2 | | 10/2007 | Hou |
| 7,318,782 B2 | | 1/2008 | Imamoto et al. |
| 7,462,110 B2 | | 12/2008 | Yamamoto |
| 7,537,528 B2 | | 5/2009 | Rice et al. |
| 7,572,194 B2 | | 8/2009 | Yamamoto |
| 7,637,823 B2 | | 12/2009 | Shimazaki et al. |
| 7,651,410 B2 | | 1/2010 | Shimazaki |
| 7,775,904 B2 | | 8/2010 | Hirano |
| 7,828,672 B2 | | 11/2010 | Billings |
| 7,871,339 B2 | | 1/2011 | Sanchez et al. |
| 8,257,196 B1 | | 9/2012 | Abbott et al. |
| 8,444,505 B2 | * | 5/2013 | Beach ............... A63B 53/0466 473/334 |
| 8,449,405 B2 | | 5/2013 | Jertson et al. |
| 8,951,143 B2 | | 2/2015 | Morales |
| 9,017,186 B2 | | 4/2015 | Jertson |
| 9,089,748 B2 | | 7/2015 | Morales |
| 9,539,475 B2 | | 1/2017 | Morales |
| 9,878,222 B2 | * | 1/2018 | Morales ............ A63B 53/0466 |
| 2004/0067799 A1 | | 4/2004 | Yamamoto |
| 2005/0148405 A1 | | 7/2005 | Imamoto |
| 2006/0100029 A1 | | 5/2006 | Lo |
| 2007/0049400 A1 | | 3/2007 | Imamoto et al. |
| 2007/0281796 A1 | | 12/2007 | Gilbert et al. |
| 2008/0015049 A1 | | 1/2008 | Imamoto |
| 2013/0303305 A1 | | 11/2013 | Myrhum et al. |

* cited by examiner

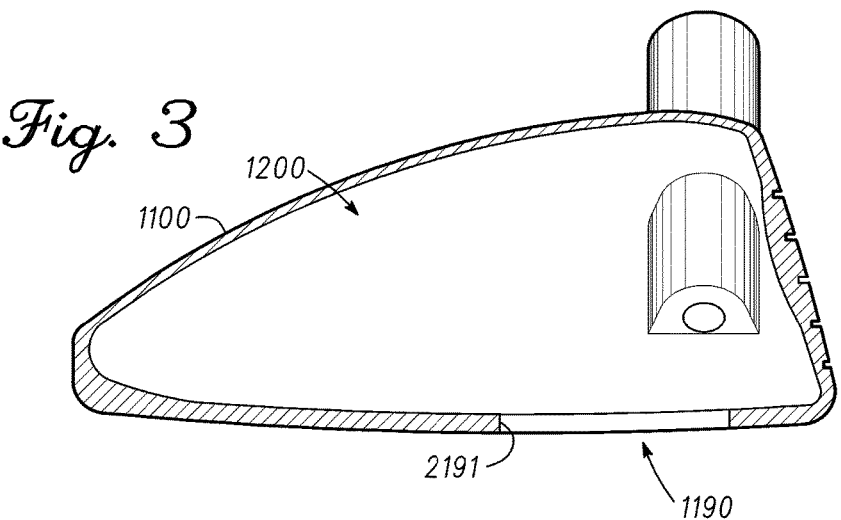
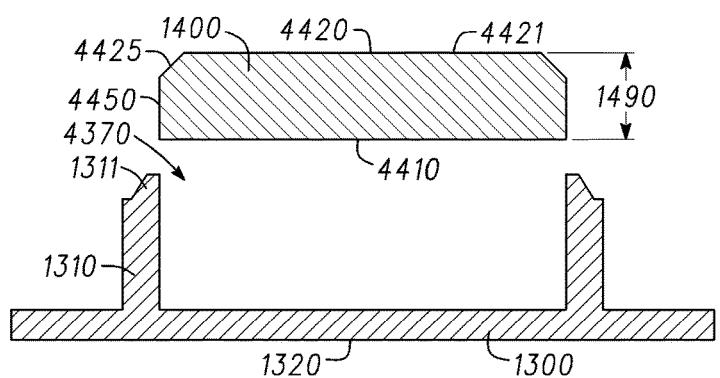
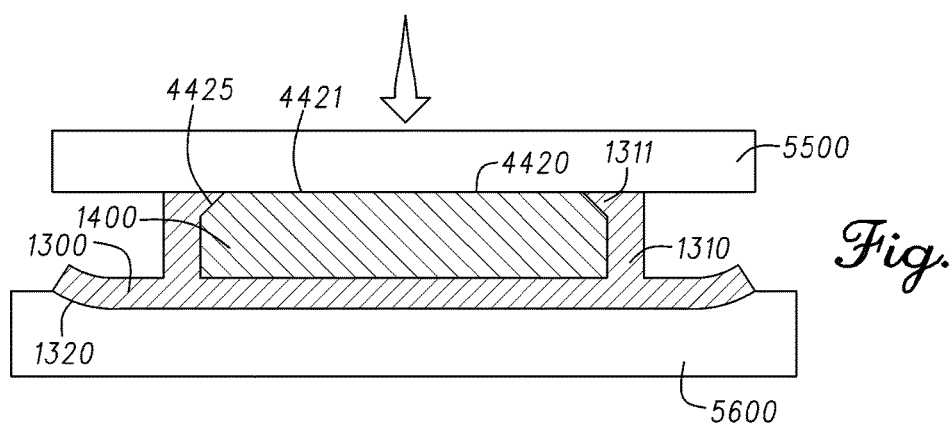

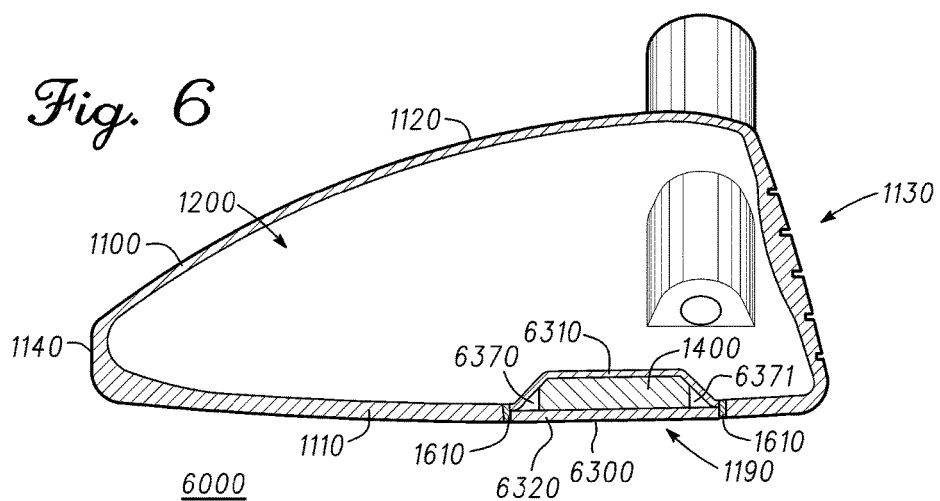
Fig. 6
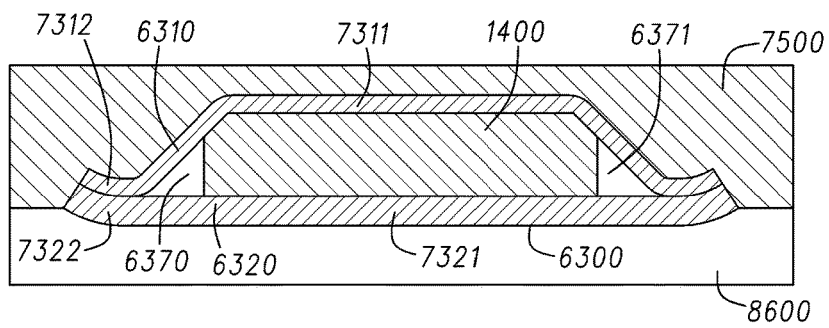
Fig. 7
Fig. 8

GOLF CLUB WEIGHT ATTACHMENT MECHANISMS AND RELATED METHODS

CROSS-REFERENCE TO RELATED APPLICATIONS

This is a continuation of U.S. patent application Ser. No. 15/369,303, filed on Dec. 5, 2016, which is a continuation of U.S. patent application Ser. No. 14/614,175, now U.S. Pat. No. 9,539,475, filed on Feb. 4, 2015, which is a continuation of U.S. patent application Ser. No. 13/745,507, now U.S. Pat. No. 8,951,143, filed on Jan. 18, 2013, which further claims priority to Provisional Patent Application No. 61/590,228, and is a continuation-in-part application of U.S. patent application Ser. No. 12/762,182, now U.S. Pat. No. 8,449,405, filed on Apr. 16, 2010, which claims priority to U.S. Provisional Patent Application No. 61/186,311, filed Jun. 11, 2009, all of which are fully incorporated herein by reference.

TECHNICAL FIELD

The present disclosure relates generally to sports equipment, and relates, more particularly, to golf club weight attachment mechanisms and related methods.

BACKGROUND

During the evolution of club head design for sports equipment, several strategies have been employed to manipulate or alter the physical and/or gaming characteristics of club heads. For example, golf club heads have been designed to accommodate weights that alter or adjust the distribution of mass across a body of such club heads.

The placement of such weights, however, can be problematic in some situations. For example, there can be cases where materials used to form the weights may not be compatible for proper bonding with materials used to form the body of the club head. In such cases, bonding mechanisms such as welding may not provide the structural integrity required by the bond to withstand stresses while still properly securing the weights to the club head. Using other weight materials that may be compatible for bonding with the body of the club head may lead to other problems, such as unwieldy or larger weight configurations that would be harder to accommodate within the body of the club head for proper weight distribution and/or aesthetic considerations.

Accordingly, needs exist for mechanisms and/or procedures capable of overcoming the limitations described above.

BRIEF DESCRIPTION OF THE DRAWINGS

The present disclosure may be better understood from a reading of the following detailed description of examples of embodiments, taken in conjunction with the accompanying figures.

FIG. 3 illustrates a side cross-sectional view the golf club head of FIG. 1 without the weighted shell portion coupled to a body opening thereof.

FIG. 4 illustrates a side cross-sectional view of a weight member prior to coupling to a bracket of the weighted shell portion of FIG. 1.

FIG. 5 illustrates a side cross-sectional view of the weight member secured to the bracket after swedging by a press.

FIG. 6 illustrates a side cross-sectional view of a golf club head with a weighted shell portion coupled thereto.

FIG. 7 illustrates a side cross-sectional view of the weight member prior to encapsulation within the shell portion of FIG. 6.

FIG. 8 illustrates a side cross-sectional view of the weight member after encapsulation within the shell portion of FIG. 6.

Figure 1:
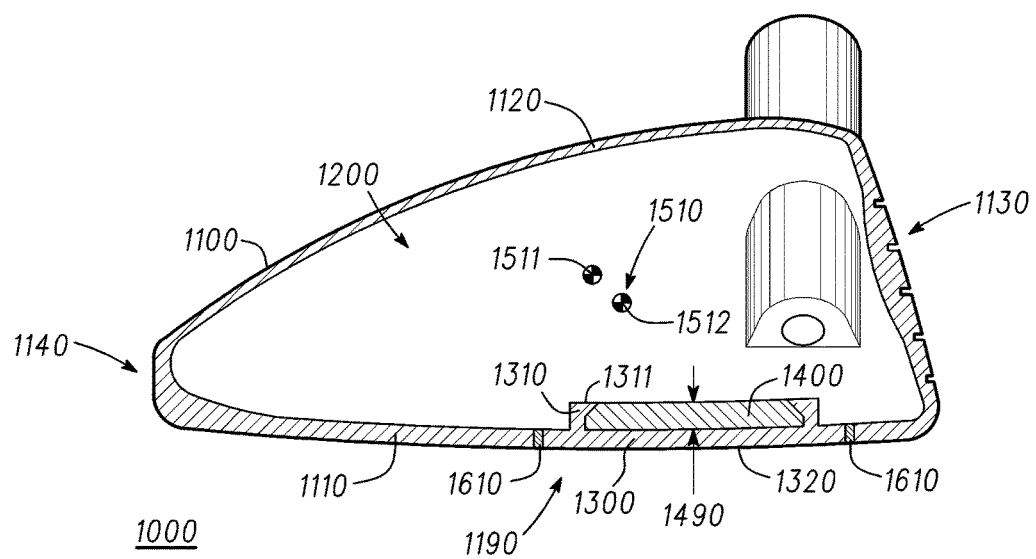
FIG. 1 illustrates a side cross-sectional view of a golf club head, along line I-I of FIG. 2, with a weighted shell portion coupled thereto.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements, mechanically or otherwise. Coupling (whether mechanical or otherwise) may be for any length of time, e.g., permanent or semi-permanent or only for an instant.

The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

DESCRIPTION

In one embodiment, a golf club head can comprise a head body comprising an interior cavity and a body opening coupled to the interior cavity, a shell portion configured to couple to the body opening, a bracket coupled to the shell portion, and a weight member coupled to the bracket. The weight member can be denser and harder than the head body, denser and harder than the bracket, and/or denser and harder than the shell portion. The bracket and the weight member can be configured to be fully contained within the interior cavity. The bracket can comprise a malleable lip configured to clamp the weight member in place at the shell portion. The bracket and the shell portion can comprise a single piece of the same material. A weld bead can couple the shell portion to the body opening throughout a total thickness of a perimeter of the shell portion. The shell portion can comprise at least a portion of a sole of the golf club head, and can be located closer to a front portion of the golf club head than a rear portion of the golf club head. The weight member can comprise a weight thickness of (a) less than approximately 6.4 mm if the golf club head comprises a fairway-wood-type head, (b) less than approximately 5.5 mm if the golf club head comprises a driver-type head, or (c) less than approximately 8.5 mm if the golf club head comprises a hybrid-type head. The weight member can also comprise a weight volume of (a) less than approximately 15 cc if the golf club head comprises the fairway-wood-type head, (b) less than approximately 12 cc if the golf club head comprises the a driver-type head, or (c) less than approximately 20 cc if the golf club head comprises the hybrid-type head. A specific gravity of the weight member can be of approximately 18 to approximately 20. A material of the weight member can be at least one of a tungsten material, a nickel material, a cadmium material, a copper material, or a metal-infused plastic material. The shell portion can comprise at least one of a steel material or a titanium material. The weight member can adjust a center of gravity of the golf club head (a) at least 0.38 mm towards the sole if the golf club head comprises the fairway-wood-type head, (b) at least 0.25 mm towards the sole if the golf club head comprises the driver-type head, or (c) at least 0.4 mm towards the sole if the golf club head comprises the hybrid-type head.

In one embodiment, a golf club head can comprise a head body comprising an interior cavity and a body opening coupled to the interior cavity, a shell portion configured to couple to the body opening, a bracket coupled to the shell portion, and a weight member coupled to the bracket. The weight member can be denser and harder than the bracket, and/or denser and harder than the shell portion. The bracket and the weight member can be configured to be fully contained within the interior cavity. The bracket can comprise a malleable lip configured to plastically deform to clamp the weight member in place at the shell portion.

In one implementation, a method for making a golf club head can comprise providing a head body of the golf club head, providing a weight member, providing a shell portion configured to couple with a body opening of the head body, coupling the weight member to the shell portion, and coupling the shell portion to the body opening. Providing the shell portion can comprises providing an interior side of the shell portion configured to face an interior cavity of the head body, and providing a bracket coupled to the interior side of the shell portion, the bracket comprising a malleable lip. Providing the weight member can comprise providing the weight member with a density greater than a density of the bracket and greater than a density of the shell portion, and providing the weight member with a hardness greater than a hardness of the bracket and greater than a hardness of the shell portion. Coupling the weight member to the shell portion can comprise inserting the weight member into the bracket, and clamping the weight member to the bracket by plastically deforming the malleable lip over at least an inner portion of the weight member, the inner portion of the weight member configured to face towards the interior cavity of the head body. Coupling the shell portion to the body opening can comprise fully containing the weight member and the bracket within the interior cavity of the head body.

In one embodiment, a golf club head can comprise a head body bounding an interior cavity and comprising a body opening, a shell portion configured to couple to the body opening, and a weight member encapsulated within the shell portion. The shell portion can comprise first and second shell sides opposite each other, and a capsule defined between the first and second shell sides and containing the weight member. A density of the weight member can be greater than a density of the shell portion and a density of the head body. The first shell side, the capsule, and the weight member, can be internal to the interior cavity. When encapsulated, the weight member can be configured to remain substantially within the capsule of the shell portion. The shell portion can comprise at least a portion of a sole of the golf club head, and can be located closer to a front portion of the head body than a rear portion of the head body. The weight member can comprise a weight mass, a weight thickness, and a weight volume. The weight thickness can be (a) less than approximately 6.4 mm if the golf club head can comprise a fairway-wood-type head, (b) less than approximately 5.5 mm if the golf club head can comprise a driver-type head, or (c) less than approximately 8.5 mm if the golf club head can comprise a hybrid-type head. The weight volume can be (a) less than approximately 15 cc if the golf club head can comprise the fairway-wood-type head, (b) less than approximately 12 cc if the golf club head can comprise the a driver-type head, or (c) less than approximately 20 cc if the golf club head can comprise the hybrid-type head. A specific gravity of the weight member can be of approximately 18 to 20. A material of the weight member can be at least one of a tungsten material, a nickel material, a cadmium material, a copper material, or a metal-infused plastic material. The shell portion can comprise at least one of a steel material, or a titanium material. The weight member can adjust a center of gravity of the golf club head (a) at least 0.38 mm towards the sole if the golf club head can comprise the fairway-wood-type head, (b) at least 0.25 mm towards the sole if the golf club head can comprise the driver-type head, or (c) at least 0.4 mm towards the sole if the golf club head can comprise the hybrid-type head. The weight mass can be (a) at least approximately 9.5% of a mass of the golf club head if the golf club head can comprise the fairway-wood-type head, (b) at least approximately 3% of the mass of the golf club head if the golf club head can comprise the driver-type head, or (c) at least approximately 12% of the mass of the golf club head if the golf club head can comprise the hybrid-type head. The weight volume can be (a) at most approximately 14% of a volume of the golf club head if the golf club head can comprise the fairway-wood-type head, (b) at most approximately 5% of the volume of the golf club head if the golf club head can comprise the driver-type head, or (c) at most approximately 30% of the volume of the golf club head if the golf club head can comprise the hybrid-type head.

In one embodiment, a golf club head can comprise a head body bounding an interior cavity and comprising a body opening, a shell portion configured to couple to the body opening, and a weight member encapsulated within the shell portion. The shell portion can comprise a first shell side, a second shell side opposite the first shell side, and a capsule defined between the first and second shell sides and containing the weight member. A density of the weight member can be greater than a density of the shell portion.

In one implementation, a method for making a golf club head can comprise providing a head body of the golf club head, providing a weight member, providing a shell portion configured to couple with a body opening of the head body, coupling the weight member to the shell portion, and coupling the shell portion to the body opening. Providing the shell portion can comprise providing a first shell side configured to face an interior cavity of the head body, providing a second shell side opposite the first shell side, and providing a capsule between the first and second shell sides to contain the weight member. A density of the weight member can be greater than a density of the shell portion.

Other examples and embodiments are further disclosed herein. Such examples and embodiments may be found in the figures, in the claims, and/or in the present description.

Figure 2:
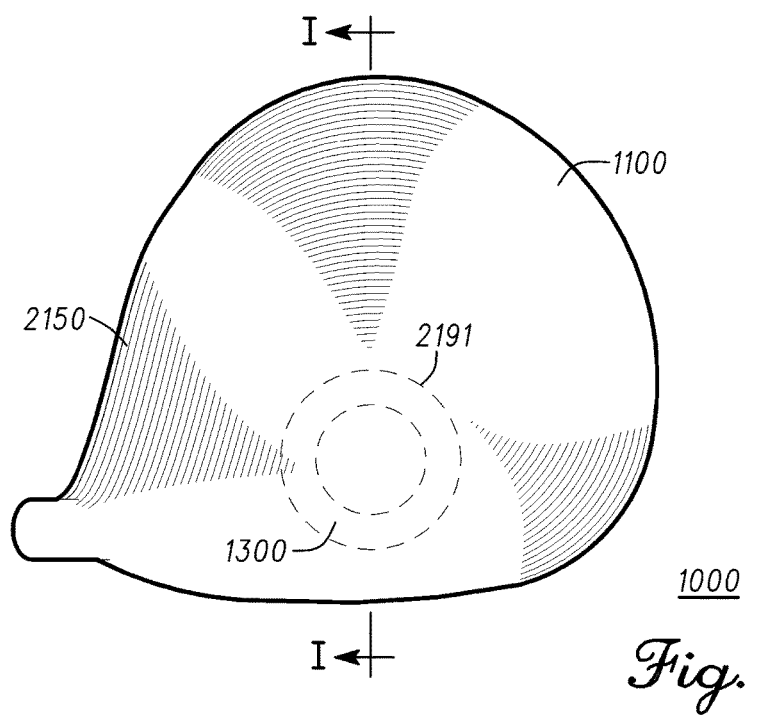
FIG. 2 illustrates a bottom view of the golf club head of FIG. 1.

Turning to the drawings, FIG. 1 illustrates a side cross-sectional view of golf club head 1000 along line I-I of FIG. 2, with shell portion 1300 coupled thereto. FIG. 2 illustrates a bottom view of golf club head 1000. FIG. 3 illustrates a side cross-sectional view of golf club head 1000 without shell portion 1300 (FIGS. 1-2) at body opening 1190.

In the present example, golf club head 1000 comprises head body 1100 bounding a portion of interior cavity 1200, and also comprises shell portion 1300 coupled to head body 1100 at body opening 1190. Body opening 1190 provides an aperture at sole portion 1110 of head body 1100 to interior cavity 1200, but there can be other embodiments where body opening 1190 could be located at other portions of head body 1100, such as at crown portion 1120, front portion 1130, rear portion 1140, and/or skirt portion 2150 (FIG. 2), to receive thereat respective shell portions similar to shell portion 1300.

Golf club head 1000 also comprises weight member 1400 coupled to shell portion 1300 via bracket 1310, where bracket 1310 comprises cavity 4370 (FIG. 4) complementary to the shape of weight member 1400. In the present example, a density of weight member 1400 is greater than a density of bracket 1310 and greater than a density of shell portion 1300, such that weight member 1400 will permit adjustment of a center of gravity of golf club head 1000 when coupled to head body 1100. Weight member 1400 and bracket 1310 are fully contained within interior cavity 1200, such as to maintain the exterior view aspect of golf club head 1000 if desired. There may be other embodiments, however, where bracket 1310 could instead face forwards or be exposed at an exterior of golf club head 1000 and/or couple weight member 1400 externally to golf club head 1000. Bracket 1310 can be integral with or non-integral with shell portion 1300.

Weight member 1400 can comprise a material with a weld-averse characteristic that can be substantially non-weldable to a material of head body 1100. For instance, the weld-averse characteristic can entail a propensity for becoming brittle or for cracking after welding or brazing. In one example, weight member 1400 can comprise a tungsten material, a nickel material, a cadmium material, a copper material, a gold material, and/or another high density material, where such material(s) may be substantially pure, dense alloys thereof, or composites thereof, and/or where such materials can comprise a specific gravity greater than approximately 14, such as a specific gravity of approximately 18-20. In one example, one such composite material can comprise a metal-infused plastic and/or resin, such as an infused thermoplastic urethane material having tungsten, nickel, cadmium, copper, gold, and/or other dense metal particles. In the same or other embodiments, a material of shell portion 1300 and/or a material of head body 1100, such as at perimeter 2191 (FIG. 2) of body opening 1190, may comprise a lower density material, such as a steel material or a titanium material, that would be substantially incompatible for reliably welding or brazing with the material of weight member 1400.

In light of the above, bracket 1310 is configured to secure weight member 1400 in place at shell portion 1300 in a non-welded and non-brazed manner, where shell portion 1300 can be welded or brazed to head body 1100 at perimeter 2191 (FIGS. 2-3) of body opening 1190. In the present example, bracket 1310 comprises malleable lip 1311 to secure weight member 1400 in place, as further described below, and is thus configured to secure weight member 1400 to shell portion 1300 without the need to rely on screw(s), adhesive(s), rivet(s), welding, or brazing. In this present example, weight member 1400 is coupled or secured to shell portion 1300 only by using malleable lip 1311 to physically keep weight member 1400 against shell portion 1300.

FIG. 4 illustrates a side cross-sectional view of weight member 1400 prior to coupling to bracket 1310 of shell portion 1300. FIG. 5 illustrates a side cross-sectional view of weight member 1400 secured to bracket 1310 after swedging by press 5500. In the present example, weight member 1400 comprises shell end 4410 configured to face shell portion 1300, and interior end 4420 opposite shell end 4410 and configured to face interior cavity 1200 (FIG. 1) of golf club head 1000 (FIG. 1) when shell portion 1300 is coupled to body opening 1190 (FIG. 1). As seen in FIG. 4, malleable lip 1311 is initially upright to permit weight member 1400 to be inserted into bracket 1300, but as seen in FIG. 5, is configured to fold over at least a portion of a perimeter of interior end 4420 of weight member 1400 to thereby secure weight member 1400 to shell portion 1300.

Returning to FIG. 4, interior end 4420 of weight member 1400 also comprises interior end surface 4421 and chamfer transition 4425 between interior end surface 4421 and weight sidewall 4450 of weight member 1400. As seen in FIG. 5, malleable lip 1311 of bracket 1310 is configured to substantially conform to a shape complementary to chamfer transition 4425 when pressed by press 5500 against weight member 1400. Chamfer transition 4425 thus allows malleable lip 1311 to engage and secure weight member 1400 without placing undue stress on bracket 1300 and/or weight member 1400, and permits malleable lip 1311 to conform to a predetermined thickness and shape to remain structurally sound when pushed and deformed by press 5500 to permit proper securing of weight member 1400. In the present example, malleable lip 1311 of bracket 1310 is configured to fold over across an entirety of the perimeter of interior end 4420 of weight member 1400. In this example, chamfer transition 4425 also extends across an entirety of the perimeter of interior end 4420 of weight member 1400. There can be other embodiments, however, where malleable lip 1311 can be subdivide into several separate lips, which could each fold over respective portions of the perimeter of interior end 4420 of weight member 1400. There can also be other embodiments where chamfer transition 4425 could be entirely or partially absent from weight member 1400, such that malleable lip 1311 would fold directly over part of interior end surface 4421 of weight member 1400 when pushed and deformed by press 5500.

In the present embodiment of FIG. 5, shell portion 1300 is shown pressed by press 5500 against die 5600, where die 5600 is configured to shape shell exterior 1320 of shell portion 1300 to a predetermined shape. The predetermined shape imparted to shell exterior 1320 by die 5600 can be configured to match a contour of head body 1100, and/or to align a perimeter of shell portion 1300 for proper bonding with perimeter 2191 (FIGS. 2-3) of body opening 1190 (FIGS. 2-3). In some examples, press 5500 can comprise a 60-120 ton press. In the same or other examples, shell exterior 1320 can be shaped to its predetermined shape against die 5600 concurrently as press 5500 compresses malleable lip 1311 against weight member 1400.

Weight member 1400 can be configured to remain substantially undeformed in the present embodiment when malleable lip 1311 of bracket 1310 is pushed against it by press 5500. In some examples, the chamfer transition 4425 can permit better distribution of compression stresses from press 5500 as malleable lip 1131 is compressed over interior end 4420 of weight member 1400. In the same or other examples, the structure and/or density of the material of weight member 1400 is resilient enough to withstand deformation and/or structural degradation from press 5500, where such strength characteristics would not be otherwise possible if weight member 1400 were limited to comprising instead a weaker or less dense alloy suitable for welding or brazing to body 1100 (FIG. 1).

Because of the use of bracket 1310 and shell portion 1300, weight member 1400 can have a high density notwithstanding its weld-averse characteristics with respect to the material of body 1100. Such high density can permit a volume and thickness 1490 (FIG. 4) of weight member 1400 to be minimized for more precise location and adjustment of one or more characteristics of golf club head 1000.

In light of the above, in one example, such as for a fairway-wood-type club head similar to golf club head 1000, weight member 1400 can comprise a mass of approximately 25 grams to 125 grams, a volume less than approximately 15 cc, and/or a thickness less than of approximately 6.4 mm. In such an example, the golf club head 1000 can comprise a volume of approximately 110 cc to approximately 250 cc, and/or a mass of approximately 200 grams to approximately 240 grams. Additionally, for such examples, weight member 1400 can comprise a weight mass of at least approximately 9.5% of the mass of golf club head 1000, and/or a weight volume of at most approximately 14% of the volume of golf club head 1000.

In another example, such as for a driver-type club head otherwise similar to golf club head 1000, a weight member similar to weight member 1400 can comprise a mass of approximately 15 grams to 60 grams, a volume less than approximately 12 cc, and/or a thickness less than of approximately 5.5 mm. In such an example, the golf club head 1000 can comprise a volume of approximately 300 cc to approximately 600 cc, and/or a mass of approximately 170 grams to approximately 230 grams. Additionally, for such examples, the weight member can comprise a weight mass of at least approximately 3% of the mass of golf club head 1000, and/or a weight volume of at most approximately 5% of the volume of golf club head 1000.

In another example, such as for a hybrid-type club head otherwise similar to golf club head 1000, a weight member similar to weight member 1400 can comprise a mass of approximately 30 grams to 140 grams, a volume less than approximately 20 cc, and/or a thickness less than of approximately 8.5 mm. In such an example, the golf club head 1000 can comprise a volume of approximately 70 cc to approximately 200 cc, and/or a mass or approximately 210 grams to approximately 260 grams. Additionally, for such examples, the weight member can comprise a weight mass of at least approximately 12% of the mass of golf club head 1000, and/or a weight volume of at most approximately 30% of the volume of golf club head 1000.

Considering the above and returning to FIG. 1, because the thickness and/or volume of weight member 1400 is minimized, compared with another weight member made of a less dense material or alloy, more of the mass of weight member 1400 will be closer to shell exterior 1320 of shell portion 1300, thereby permitting greater adjustment of a center of gravity of golf club head 1000 than would be possible with a weldable but less dense weight member.

In one example, such as for a fairway-wood-type club head similar to golf club head 1000, center of gravity 1510 of golf club head 1000 can be adjusted by weight member 1400, from non-adjusted center of gravity location 1511 to adjusted center of gravity location 1512, by approximately 0.38 mm to approximately 0.9 mm towards sole portion 1110. Center of gravity 1510 can is also adjusted towards front portion 1130 in the present example, where such adjustment can enhance the launch characteristics of the fairway-wood-type club head by reducing the amount of clubhead rotation that takes place during the impact with a golf ball. By reducing the clubhead rotation, more of the kinetic energy of the club can be transferred to the golf ball, which can lead to higher ball velocity and reduced backspin for increased distance and/or accuracy.

In another example, such as for a driver-type club head otherwise similar to golf club head 1000, the center of gravity of the driver-type club head can be adjusted towards its sole by weight member 1400 by approximately 0.25 mm to approximately 0.80 mm. In another example, such as for a hybrid-type club head otherwise similar to golf club head 1000 (FIG. 1), the center of gravity of the hybrid-type club head can be adjusted towards its sole by weight member 1400 by approximately 0.40 mm to approximately 1.2 mm.

Although in the present example shell portion 1300 and weight member 1400 are shown in FIGS. 1-2 located towards sole portion 1110 and front portion 1130 of head body 1100, there can be other embodiments where shell portion 1300 and weight member 1400 could be located towards other portions of head body 1100, such as towards crown portion 1120, rear portion 1140, and/or skirt portion 2150 depending on the feature or characteristic of golf club head 1000 desired to be adjusted. In addition, although shell portion 1300 is shown as comprising a portion of sole portion 1110, there can be other embodiments where shell portion 1300 comprises substantially all, and/or an entirety of, sole portion 1110. Furthermore, although weight member 1400 (FIGS. 1-2, 4-5), bracket cavity 4370 (FIG. 4), and shell portion 1300 (FIGS. 1-2, 4-5) are shown as comprising substantially circular shapes, there can be other embodiments where weight member 1400, bracket cavity 4370, and/or shell portion 1300 can comprise other shapes such as rectangular shapes, pentagonal shapes, shield shapes, and/or shapes tailored to conform to a contour of at least part of golf club head 1000.

After weight member 1400 has been secured via malleable lip 1311 to bracket 1310, as described above, shell portion 1300 can be coupled to body opening 1190 to seal interior cavity 1200 of golf club head 1000. For instance, shell portion 1300 can be secured to perimeter 2191 (FIG. 2) of body opening 1190 (FIGS. 1-3) via welding or brazing, such as with weld bead 1610 (FIG. 1). In the present example, for a better bond, weld bead 1610 couples shell portion 1300 to body opening 1190 throughout a total thickness of the perimeter of shell portion 1300 (FIGS. 1-2) at body opening 1190.

In the present example, bracket 1310 and shell portion 1300 can comprise the same material, both being cast, forged, or otherwise formed from a single piece of the same material. Also in the present example, shell portion 1300 can comprises the same material as used to form perimeter 2191 (FIG. 2) of body opening 1190, such as a titanium material, a steel material, and/or a zirconium material. Accordingly, shell portion 1300 can be readily welded or brazed to perimeter 2191 of body opening 1190. There also can be examples where shell portion 1300 can comprise a material with a density greater than the density of head body 1100, such as a tungsten alloy with a specific gravity approximately 10 to 12, configured to be welded or brazed to perimeter 2191 (FIG. 2) of body opening 1190.

Continuing with the figures, FIG. 6 illustrates a side cross-sectional view of golf club head 6000. Golf club head 6000 can be similar to golf club head 1000 (FIGS. 1-3), but comprises shell portion 6300 instead of shell portion 1300 (FIGS. 1-2, 4-5). Shell portion 6300 can be similar to shell portion 1300. For example shell portion 6300 can comprise dimensions similar to those shown or described with respect to shell portion 1300 (FIGS. 1-2, 4-5). In addition, shell portion 6300 can be located to comprise at least a portion of, and/or an entirety of, one or more portions of head body 1100, such as sole portion 1110, crown portion 1120, front portion 1130, rear portion 1140, and/or the skirt portion.

Shell portion 6300 differs from shell portion 1300, however, with respect to the way weight member 1400 couples to shell portion 6300. Whereas shell portion 1300 relied on bracket 1310 and malleable lip 1311 to secure weight member 1400 in FIGS. 1-5, shell portion 6300 comprises weight member 1400 encapsulated between shell sheet 6310 and shell sheet 6320. In the present example, shell portion 6300 comprises: (a) shell sheet 6310 having a side thereof facing interior cavity 1200, and (b) shell sheet 6320 opposite shell sheet 6310 and having a side thereof facing towards an exterior of shell portion 6300, where capsule 6370 is defined between shell sheets 6310 and 6320 to contain weight member 1400. The density of weight member 1400 is greater than the density of either of shell sheets 6310 and 6320 of shell portion 6300.

FIG. 7 illustrates a side cross-sectional view of weight member 1400 prior to encapsulation within shell portion 6300. FIG. 8 illustrates a side cross-sectional view of weight member 1400 after encapsulation within shell portion 6300 by press 7500 and die 8500. Shell sheet 6310 comprises shell sheet capsule section 7311 defining a portion of capsule 6370, and shell sheet periphery section 7312 bounding shell sheet capsule section 7311. Shell sheet 6320 comprises shell sheet capsule section 7321 defining a portion of capsule 6370, and shell sheet periphery section 7322 bounding shell sheet capsule section 7321. When shell sheets 6310 and 6320 are pressed against each other by press 7500 to encapsulate weight member 1400, shell sheet capsule section 7311 of shell sheet 6310 is stamped over weight member 1400 to conform to a shape thereof. As a result, capsule 6370 is thus defined and bounded between shell sheet capsule sections 7311 and 7321, and shell sheet periphery sections 7321 and 7322 are brought together to seal weight member 1400 within capsule 6370, where shell sheet periphery section 7312 conforms to shell sheet periphery section 7322 in the present example. In some examples, weight member 1400 can be configured to remain substantially undeformed when shell sheet 6310 is stamped over it. As can be seen in FIGS. 6 and 8, shell sheets 6310 and/or 6320 need not completely conform to the shape of weight member 1400, and one or more capsule voids 6371 can remain within capsule 6373 after weight member 1400 is securely encapsulated therein. There can be other examples, however, where weight member 1400 can be configured to deform when shell sheet 6310 is stamped over weight member 1400, so that shell sheet 6310 can better conform to the shape of weight member 1400 and/or to minimize the volume of one or more of capsule voids 6371.

Die 8600 (FIG. 8) is similar to die 5600 (FIG. 5), and is configured to impart a predetermined shape to the exterior of shell sheet 6320, similar to the predetermined shape described above for shell exterior 1320 (FIG. 5), when shell portion 6300 is pressed between press 7500 and die 8600 (FIG. 8). In other examples, however, shell sheets 6310 and/or 6320 may be separately pre-shaped prior to being coupled together, and could then be brought together around weight member 1400 without press 7500.

Once cavity 6370 has been defined around weight member 1400, shell sheet periphery sections 7312 and 7322 can be secured to each other if desired, such as by spot-welding, prior to coupling shell portion 1300 to body opening 1190. In addition, because the shape of capsule 6370 between shell sheets 6310 and 6311 conforms to the shape of weight member 1400, weight member 1400 can thus be secured to shell portion 6300 without having to rely on welding, brazing, screws, rivets, or adhesives. In this present example, weight member 1400 is coupled or secured to shell portion 6300 only by using shell portion 6300 itself (and optionally, spot welding, etc. for shell portion 6300).

With weight member 1400 encapsulated within cavity 6370 between shell sheets 6310 and 6320 as described above, shell portion 6300 can be coupled to body opening 1190 of head body 1100 as seen in FIG. 6, and as described above with respect to shell portion 1300 (FIGS. 1-3). In some examples, if welding or brazing shell portion 6300 to body opening 1190, such as via weld bead 1610, a total thickness of the perimeter of each of shell sheets 6310 and 6320 can be welded or brazed to the perimeter of body opening 1190 for a better bond and/or to further secure shell sheet periphery sections 7312 and 7322 to each other. Once shell portion 6300 is secured to body opening 1190, shell sheet 6310, weight member 1400, and capsule 6370 can be fully internal to interior cavity 1200 of golf club head 6000 in the present embodiment.

In some examples, the material, mass, thickness, and/or volume for weight member 1400 as used in the embodiment of FIGS. 6-9 can be similar to one or more of those described above with respect to the embodiment of FIGS. 1-5. In the same or other examples, the material(s) of shell sheets 6310 and/or 6320 of shell portion 6300 can be similar to those described above with respect to shell portion 1300 (FIGS. 1-2, 4-5).

In the same or other examples, a center of gravity of golf club head 6000 may be adjusted by weight member 1400 and/or shell portion 6300 as described above with respect to the center of gravity 1510 of golf club head 1000 (FIG. 1).

The mass, volume, and thickness ranges described earlier for golf club head 1000 (FIG. 1) can also apply here to golf club head 6000.

Shell sheets 6310 and 6320 may comprise the same materials or different materials, depending on the embodiment. For instance, the material(s) for shell sheets 6310 and/or 6320 can comprise steel, titanium, zirconium, alloys thereof, and/or other weldable alloys such as a weldable tungsten nickel alloy. In some examples, to better conform to the shape of weight member 1400 when pressed by press 7500 (FIG. 7), shell sheet 6310 may be configured to comprise greater deformability than shell sheet 6320. For instance, the material of shell sheet 6310 can be less dense, more ductile, and/or more malleable than the material of shell sheet 6320. In the same or other embodiments, the thickness of shell sheet 6310 can be configured to be less than the thickness of shell sheet 6320 to better conform to the shape of weight member 1400. The thickness of shell sheet 6310 and/or shell sheet 6320 can be of at least approximately 4.5 mm in some implementations to permit proper welding via weld bead 1610.

Figure 9:
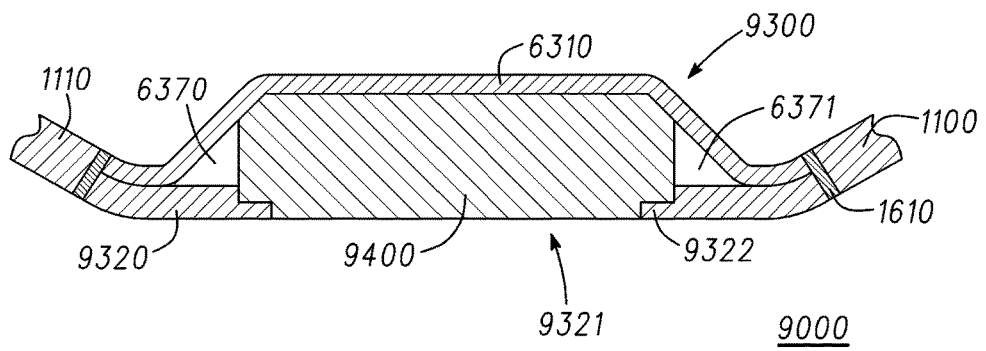
FIG. 9 illustrates a portion of a golf club head comprising a weighted shell portion coupled thereto.

There can also be other embodiments where, after encapsulation, weight member 1400 could still be not fully enclosed within shell portion 6300, and or where weight member 1400 can still be visible from an exterior of golf club head 6000. As an example, FIG. 9 illustrates a portion of golf club head 9000 comprising body 1100 and shell portion 9300 coupled thereto along with encapsulated weight member 9400. Shell portion 9300 can be similar to shell portion 1300 (FIGS. 4-5) and/or to shell portion 6300 (FIGS. 6-8), but comprises passageway or port hole 9321 at shell sheet 9320 through which weight member 9400 can be seen from an exterior of golf club head 9000. In the present example, weight member 9400 is similar to weight member 1400 (FIGS. 1, 4-8), and shell sheet 9320 comprises lip 9322 to prevent weight member 9400 from dislodging from capsule 6370 through port hole 9321. Weight member 9400 also occupies at least a portion of the volume of port hole 9321 in the present example, where port hole 9321 thereby permits more of the dense material of weight member 9400 to be closer to the exterior of shell portion 9300 for greater adjustment of the center of gravity or other characteristics of golf club head 9000. Again, no welding, brazing, screws, rivets, or adhesives are used to couple or secure weight member 9400 to shell portion 9300. In this present example, weight member 9400 is coupled or secured to shell portion 9300 only by using shell portion 9300 itself (and optionally, spot welding, etc. for shell portion 9300).

Figure 10:
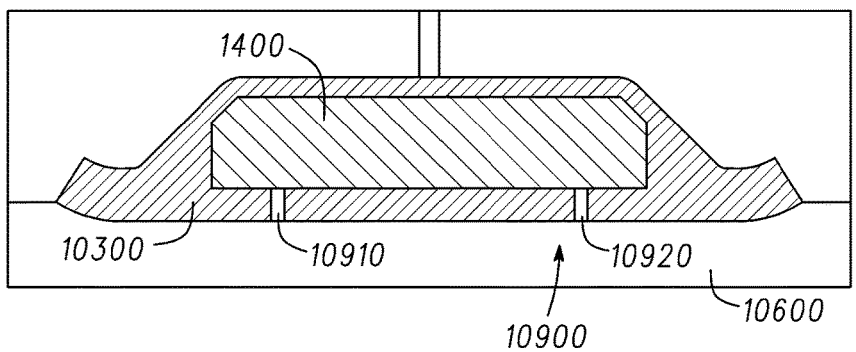
FIG. 10 illustrates a side cross-sectional view of a weight member encapsulated within a cast shell portion.

In another embodiment, FIG. 10 illustrates a side cross-sectional view of weight member 1400 encapsulated within shell portion 10300. Shell portion 10300 can be similar to one or more of shell portion 1300 (FIGS. 1-2, 4-5), shell portion 6300 (FIGS. 6-8), and/or shell portion 9300 (FIG. 9). In the present example, however, shell portion 10300 is configured to be cast within mold 10600, where the material of shell portion 10300 can be introduced in liquid form to encapsulate and conform once hardened as a single piece of material to the shape of weight member 1400 therewithin. Weight member 1400 can be held in place within mold 10600 by one or more stands 10900, such as stands 10910 and 10920, while the material of shell portion 10300 hardens. In some examples, the one or more stands 10900 can be part of, or protrude from, weight member 1400 or mold 10600. Again, no welding, brazing, screws, rivets, or adhesives are used to couple or secure weight member 1400 to shell portion 10300. In this present example, weight member 1400 is coupled or secured to shell portion 10300 only by using shell portion 10300 itself.

Figure 11:
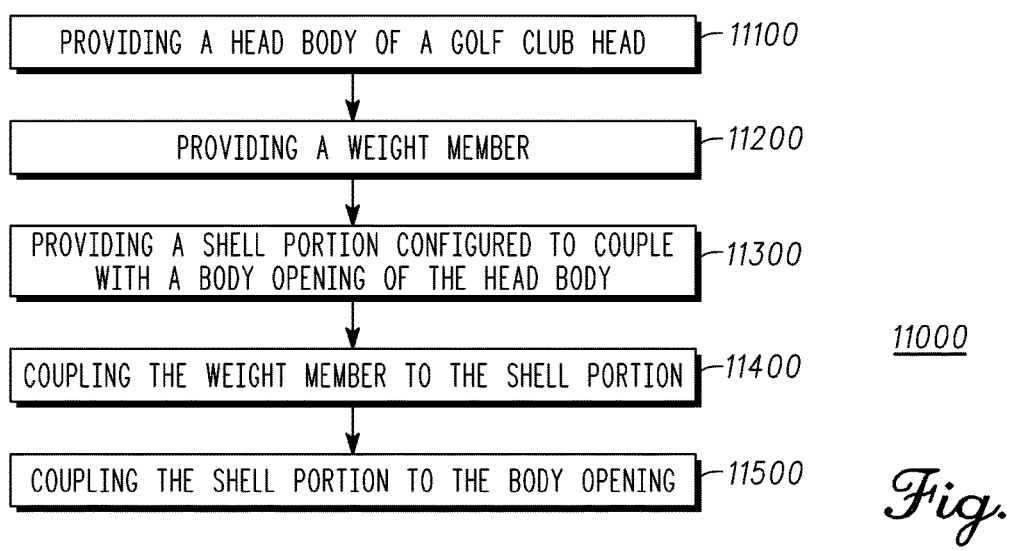
FIG. 11 illustrates a flowchart for a method which can be used to provide, form, and/or manufacture a golf club head with a weighted shell portion.

Moving on, FIG. 11 illustrates a flowchart for a method 11000, which can be used to provide, form, and/or manufacture a golf club head with a weighted shell portion in accordance with the present disclosure. In some examples, the golf club head can be similar to one or more of the golf club heads described herein. The weighted shell portion can be similar to one or more of the shell portions described herein, such as shell portion 1300 (FIGS. 1-2, 4-5), shell portion 6300 (FIGS. 6-8), shell portion 9300 (FIG. 9), and/or shell portion 10300 (FIG. 10).

Method 11000 comprises block 11100 for providing a head body of the golf club head. In some examples, the head body can be similar to a head body of one of the embodiments described above, such as head body 1100 (FIGS. 1-3, 6, 9). Although, in the figures above, head body 1100 is illustrated as a fairway-wood type golf club head body, the disclosure herein is not limited in that respect. For example, the head body could comprise a driver-type head body, a hybrid-type head body, an iron-type or wedge-type head body, or a putter-type head body in some implementations.

Block 11200 of method 11000 comprises providing a weight member. In some examples, the weight member can be similar to weight member 1400 as described above with respect to the embodiments of FIGS. 1-8 and 10, to weight member 9400 in the embodiment of FIG. 9, and/or to other similar weight members. The density of the weight member can be configured to be greater than the density of any other portion of the golf club head. In some examples, the weight member can comprise a material similar to those described above for weight member 1400, with a density greater than approximately 14. For instance, the weight member can comprise a material with a specific gravity of approximately 18 to approximately 20.

Block 11300 of method 11000 comprises providing a shell portion configured to couple with a body opening of the head body. In some examples, the shell portion can be similar to one or more of the shell portions described above, such as shell portion 1300 (FIGS. 1-2, 4-5), shell portion 6300 (FIGS. 6-8), shell portion 9300 (FIG. 9), and/or shell portion 10300 (FIG. 10). The shell portion can be configured to couple the weight member of block 11200 to the head body of block 11100. Blocks 11100, 11200, and 11300 can be performed in any sequence and/or simultaneously with each other.

In some embodiments, the shell portion can be similar to shell portion 1300 (FIGS. 1-2, 4-5), comprising an interior side configured to face an interior cavity of the head body, such as cavity 1200 of head body 1100 (FIG. 1). A bracket with a malleable lip, which can be similar to bracket 1310 with malleable lip 1311 (FIGS. 1, 4-5), can be provided coupled to the interior side of the shell portion. The shell portion and the bracket may comprise a single piece of the same material, and/or may be formed concurrently in some embodiments. In another embodiment, the shell portion can be similar to shell portion 6300 (FIGS. 6-8) and/or shell portion 9300 (FIG. 9), comprising a first shell sheet similar to shell sheet 6310 configured to face the interior cavity of the shell body, and a second shell sheet similar to shell sheet 6320 (FIG. 6) or shell sheet 9320 (FIG. 20), where the first and second shell sheets can be configured to define a capsule therebetween to contain the weight member of block 11200. In another embodiment, the shell portion, such as shell portion 10300 (FIG. 10), can be provided to be cast around the weight member of block 11200.

Next, block 11400 of method 11000 comprises coupling the weight member to the shell portion. In some examples, the weight member can be coupled to the shell portion as described above for one or more of the embodiments described with respect to FIGS. 1-10. In some examples, the shell portion can comprise a material similar to those described above with respect to shell portion 1300 (FIGS. 1-2, 4-5), to which the material of the weight member of block 11200 would be hard to reliably weld or braze. Accordingly, the shell portion can be configured to secure the weight member to the shell portion by welding or brazing the weight member. In addition, in the same or other examples, the weight member can be secured to the shell portion in a non-screwed, non-riveted, and non-adhesive manner for better reliability, durability, and resistance to impact stresses.

For instance, the weight member can be coupled to the shell portion by inserting the weight member into a bracket similar to bracket 1310 (FIGS. 1, 4-5), and can be secured thereto by compressing a malleable lip against an interior end of the weight member, similar to malleable lip 1311 as compressed against the interior end 4420 of weight member 1400 described above with respect to FIGS. 1-5.

In another example, the weight member can be coupled to the shell portion by encapsulation between two shell sheets, such as shell sheets 6310 and 6320 (FIGS. 6-8), or such as shell sheets 6310 and 9320 (FIG. 9). In the same or other examples, such encapsulation can be made by compressing and/or stamping the shell sheets against the weight member using a press and/or a die similar to press 7500 and/or die 8600 (FIGS. 7-8). There also can be other examples where one or more of the shell sheets can be pre-stamped or pre-formed with respect to the shape of the weight member prior to being coupled together to encapsulate the weight member. In another example, the weight member can be coupled to the shell portion by casting the material of the shell portion in liquid form around the weight member using a mold, and then hardening the material of the shell portion to encapsulate the weight member, as described above with respect to FIG. 10.

Next, block 11500 of method 11000 comprises coupling the shell portion of block 11300 to a body opening of the head body of block 11100. In some embodiments, the body opening of the head body can be similar to body opening 1190 (FIGS. 1, 3) of head body 1100, but there can be other embodiments where the body opening can be located elsewhere besides at the sole of the golf club head, such as towards a crown portion, a rear portion, and/or a front portion of the golf club head. In the same or other embodiments, the shell portion can be secured to a perimeter of the body opening by welding or brazing, as described above with respect to the coupling of one or more of the shell portions described in FIGS. 1-10 to perimeter 2191 of body opening 1190 (FIGS. 2-3). Although in some examples a material of the shell portion of block 11300 can be the same as that of the head body of block 11100 at the perimeter of the body opening thereof, there can be other embodiments where the material of the shell portion can be more dense than the material of the head body while still remaining weldable or brazeable thereto. In some embodiments, a shell exterior of the shell portion can be configured, via a die, a mold, or other suitable mechanism, to match a contour of the head body when coupled thereto in block 11500.

Because of the high density of the weight member of block 11200 permitted by the use of the shell portion of block 11300, a mass of the weight member can be maximized while minimizing the volume or thickness of the weight member for more precise location and dramatic adjustment of a center of gravity or other characteristics of the golf club head of method 11000. In some examples, the mass and volume relationships between the weight member of block 11200 and the golf club head of method 11000 can be similar to those described above with respect to weight member 1400 and the golf club heads of FIGS. 1-10). In addition, the location of the center of gravity of the golf club head of method 11000 can be adjusted by the weight member of block 11200 similar to the adjustments described above for the golf club heads of FIGS. 1-10 by weight members 1400 and 9400.

In some examples, one or more of the different blocks of method 11000 can be combined into a single block or performed simultaneously, and/or the sequence of such blocks can be changed. For example, in some embodiments, two or more of blocks 11100, 11200, or 11300 may be combined if desired. In the same or other examples, some of the blocks of method 11000 can be subdivided into several sub-blocks. As an example, block 11100 may be subdivided with respect to providing and/or coupling together several portions of the head body, such as for coupling a face plate to the front portion of the head body. There can also be examples where method 11000 can comprise further or different blocks. As an example, method 11000 may comprise another block for polishing the junction between the shell portion and the body opening to conform to an external contour of the golf club head.

In addition, there may be examples where method 11000 can comprise only part of the steps described above. For instance, method 11000 may comprise only blocks 11200-11400, without having to provide the head body in block 11100 and without having to provide the golf club head in completed form. Other variations can be implemented for method 11000 without departing from the scope of the present disclosure.

Although the golf club weight attachment mechanisms and related methods herein have been described with reference to specific embodiments, various changes may be made without departing from the spirit or scope of the present disclosure. As an example, there may be embodiments where the weight attachment mechanisms described herein can be implemented in iron-type, wedge-type, and/or putter-type golf club heads having an interior cavity configured to accommodate a shell portion and a weight member similar to those described herein. Additional examples of such changes and others have been given in the foregoing description. Other permutations of the different embodiments having one or more of the features of the various figures are likewise contemplated. Accordingly, the specification, claims, and drawings herein are intended to be illustrative of the scope of the disclosure and is not intended to be limiting. It is intended that the scope of this application shall be limited only to the extent required by the appended claims.

The golf club weight attachment mechanisms and related methods discussed herein may be implemented in a variety of embodiments, and the foregoing discussion of certain of these embodiments does not necessarily represent a complete description of all possible embodiments. Rather, the detailed description of the drawings, and the drawings themselves, disclose at least one preferred embodiment, and may disclose alternative embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claims.

As the rules to golf may change from time to time (e.g., new regulations may be adopted or old rules may be eliminated or modified by golf standard organizations and/or governing bodies such as the United States Golf Association (USGA), the Royal and Ancient Golf Club of St. Andrews (R&A), etc.), golf equipment related to the apparatus, methods, and articles of manufacture described herein may be conforming or non-conforming to the rules of golf at any particular time. Accordingly, golf equipment related to the apparatus, methods, and articles of manufacture described herein may be advertised, offered for sale, and/or sold as conforming or non-conforming golf equipment. The apparatus, methods, and articles of manufacture described herein are not limited in this regard.

While the above examples may be described mostly in connection with fairgay-wood type golf club heads, the apparatus, methods, and articles of manufacture described herein may be applicable to other types of golf club such as a driver-type golf club, an iron-type golf club, a wedge-type golf club, or a putter-type golf club. Alternatively, the apparatus, methods, and articles of manufacture described herein may be applicable other type of sports equipment such as a hockey stick, a tennis racket, a fishing pole, a ski pole, etc.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

The invention claimed is:

1. A golf club head comprising:
a head body selected from a group of golf club heads consisting of a fairway-wood type head, a driver-type head, and a hybrid-type head; the head body comprising:
an interior cavity;
a body opening coupled to the interior cavity;
a shell portion configured to couple to the body opening; and
a weight member encapsulated within the shell portion;
wherein:
the shell portion comprises:
  a first shell sheet comprising:
  a first shell sheet periphery section;
  a second shell sheet comprising:
  a second shell sheet periphery section;
  a lip; and
  a port hole;
  a capsule defined between the first and second shell sheets and containing the weight member;
  the first and second shell sheet periphery sections are secured to each other;
wherein the first shell sheet has a first side facing the interior cavity and a second side in contact with the weight member;
wherein the second shell sheet has a first side in contact with the weight member and a second side facing towards an exterior of the shell portion:
the capsule comprises one or more voids; and
the weight is visible from an exterior surface of the golf club head;
wherein:
the weight member is coupled to the shell portion without welding, brazing, adhesives, rivets, or screws.

2. The golf club head of claim 1, wherein:
the first shell sheet is thinner than the second shell sheet.

3. The golf club head of claim 1, wherein:
a density of the weight member is greater than a density of the shell portion.

4. The golf club head of claim 1, wherein:
the first and second shell sheet are integral with each other at the periphery sections beyond the voids.

5. The golf club head of claim 1, wherein: the first shell sheet, the capsule, and the weight member are within the interior cavity.

6. The golf club head of claim 1, wherein:
the first shell sheet comprises a first material,
the first material is selected from the group consisting of a steel material, a titanium material, a zirconium material, a tungsten nickel alloy material, and a mixture thereof;
the second shell sheet comprises a second material that is different than the first material,
the second sheet material is selected from the group consisting of a steel material, a titanium material, a zirconium material, a tungsten nickel alloy material, and a mixture thereof; and
the first material comprises at least one of a greater ductility or a greater malleability than the second material.

7. The golf club head of claim 1, wherein:
the weight member comprises:
a weight mass;
an interior end located near the first shell sheet;
an exterior end opposite the interior end located near the second shell sheet; and
a sidewall between the interior end and the exterior end;
the interior end of the weight member comprises:
an interior surface; and
a chamfer transition between the sidewall and the interior surface;
wherein the weight member is located between the first and second shell sheets,
the first shell sheet is configured to fold over at least a portion of the interior end of the weight member.

8. The golf club head of claim 1, wherein:
the body opening is located at a sole of the golf club head.

9. The golf club head of claim 1, wherein:
the weight member occupies at least a portion of a volume of the port hole to allow the weight to be visible from an exterior surface of the golf club head.

10. A golf club head comprising:
a head body selected from a group of golf club heads consisting of a fairway-wood type head, a driver-type head, and a hybrid-type head; the head body comprising:
an interior cavity;
a body opening coupled to the interior cavity;
a shell portion configured to couple to the body opening; and
a weight member encapsulated within the shell portion; wherein:

the shell portion comprises:
a first shell sheet comprising: a first shell sheet periphery section;
a second shell sheet comprising:
a second shell sheet periphery section;
wherein the first shell sheet has a first side facing the interior cavity and a second side in contact with the weight member;
wherein the second shell sheet has a first side in contact with the weight member and a second side facing towards an exterior of the shell portion;
a lip; and
a port hole;
a capsule defined between the first and second shell sheets and containing the weight member;
the first and second shell sheet periphery sections are secured to each other;
the capsule comprises one or more voids;
the weight is visible from an exterior surface of the golf club head;
the first shell sheet comprises a first material,
the first material is selected from the group consisting of a steel material, a titanium material, a zirconium material, a tungsten nickel alloy material, and a mixture thereof; and
the second shell sheet comprises a second material that is the same as the first material,
the second sheet material is selected from the group consisting of a steel material, a titanium material, a zirconium material, a tungsten nickel alloy material, and a mixture thereof;
wherein:
the weight member is coupled to the shell portion without welding, brazing, adhesives, rivets or screws.

11. The golf club head of claim 10, wherein:
the first shell sheet is thinner than the second shell sheet.
12. The golf club head of claim 10, wherein:
a density of the weight member is greater than a density of the shell portion.
13. The golf club head of claim 10, wherein:
the first and second shell sheet are integral with each other at the periphery sections beyond the voids.
14. The golf club head of claim 10, wherein:
the first shell sheet, the capsule, and the weight member are within the interior cavity.
15. The golf club head of claim 10, wherein:
the weight member comprises:
a weight mass;
an interior end located near the first shell sheet;
an exterior end opposite the interior end located near the second shell sheet; and
a sidewall between the interior end and the exterior end;
the interior end of the weight member comprises:
an interior surface; and
a chamfer transition between the sidewall and the interior surface;
wherein the weight member is located between the first and second shell sheets,
the first shell sheet is configured to fold over at least a portion of the interior end of the weight member.
16. The golf club head of claim 10, wherein:
the body opening is located at a sole of the golf club head.
17. The golf club head of claim 10, wherein:
the weight member occupies at least a portion of a volume of the port hole to allow the weight to be visible from an exterior surface of the golf club head.
18. The golf club head of claim 10, wherein:
a weld bead couples the first and second shell sheet periphery sections to the head body.

* * * * *